United States Patent
Hama et al.

(10) Patent No.: US 6,894,623 B2
(45) Date of Patent: May 17, 2005

(54) DISPLAY MONITOR FOR MULTI-OPTICAL-PATH PHOTOELECTRIC SAFETY APPARATUS AND MULTI-OPTICAL-PATH PHOTOELECTRIC SAFETY APPARATUS INCLUDING A DISPLAY MONITOR

(75) Inventors: Kiyoshi Hama, Osaka (JP); Tetsu Inoue, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 10/323,639

(22) Filed: Dec. 20, 2002

(65) Prior Publication Data

US 2003/0141975 A1 Jul. 31, 2003

(30) Foreign Application Priority Data

Jan. 25, 2002 (JP) .................................. P 2002-017571

(51) Int. Cl.[7] ................................................. G08B 5/36
(52) U.S. Cl. ............................. 340/815.54; 340/815.5; 340/815.57; 340/815.68; 340/555; 250/221; 250/222.1
(58) Field of Search ...................... 340/815.5, 815.54, 340/815.57, 815.68, 815.4, 815.43, 815.45, 541, 545.3, 552, 555, 556, 557; 250/221, 222.1; 359/334, 341.31

(56) References Cited

U.S. PATENT DOCUMENTS

| 5,130,532 | A | * | 7/1992 | Clemens ...................... 340/555 |
| 6,236,036 | B1 | * | 5/2001 | Kudo et al. .................. 250/221 |
| 6,239,423 | B1 | * | 5/2001 | Hama et al. ................. 340/556 |
| 6,414,603 | B1 | | 7/2002 | Yamaguchi et al. |
| 6,606,188 | B2 | * | 8/2003 | Shimojoh .................... 359/334 |

FOREIGN PATENT DOCUMENTS

| DE | 2343096 A | 3/1975 |
| DE | 29900149 U | 3/1999 |
| JP | 11-345548 A | 12/1999 |

* cited by examiner

Primary Examiner—Van T. Trieu
(74) Attorney, Agent, or Firm—Smith Patent Office

(57) ABSTRACT

A display monitor is provided for a multi-optical-path photoelectric safety apparatus including a plurality of multi-optical-path photoelectric sensor units. The user can determine whether a special function such as blanking is set for each optical path in a group which comprises a plurality of indicator lamps placed in a row along a longitudinal direction. The user can check the light incidence/light block status for each optical path on an indicator lamp group. The display monitor includes the plurality of indicator lamps placed in a row in the longitudinal direction. First and second switches allow the user to select the unit and the optical path to be shown on the two indicator lamp groups.

22 Claims, 11 Drawing Sheets

DISPLAY MONITOR FOR MULTI-OPTICAL-PATH PHOTOELECTRIC SAFETY APPARATUS AND MULTI-OPTICAL-PATH PHOTOELECTRIC SAFETY APPARATUS INCLUDING A DISPLAY MONITOR

BACKGROUND OF THE INVENTION

1. Field of the Invention

The present invention relates to a multi-optical-path photoelectric safety apparatus including a multi-optical-path photoelectric sensor and a display monitor for the multi-optical-path photoelectric safety apparatus. More particularly, the present invention relates to a multi-optical-path photoelectric safety apparatus including a monitor for displaying the light incidence/light block state of the sensor.

2. Discussion of the Related Art

A multi-optical-path photoelectric safety apparatus includes multi-optical-path photoelectric sensor units each comprising a light emitter and a light receiver, which are used to form a protective fence on the boundary of a work area. The light emitter comprises a large number of light emission elements placed in a row. The light receiver comprises as many light reception elements as the number of the light emission elements, also placed in a row.

The multi-optical-path photoelectric safety apparatus protects operators and workers operating a machine tool, such as a punching press, a pressing machine, a forging machine, an automatic controller, etc. Typically, the multi-optical-path photoelectric sensor unit is installed on the boundary of the work area to form a light curtain. When a part of a human body such as a finger of an operator enters the work area, the multi-optical-path photoelectric sensor unit detects it and immediately the machine operation is stopped and/or an alarm is issued.

This kind of multi-optical-path photoelectric safety apparatus comprising a display section for displaying the light incidence/light block state of the sensor unit is known. Specific examples of the display section are as follows:

(1) Only the light-incidence or blocked optical path presence of all optical paths is indicated on an output indicator lamp;

(2) a plurality of LEDs are placed in a row as a bar for displaying the percentage of the number of light-incidence optical paths;

(3) the number of light-incidence optical paths or the number of blocked optical paths is displayed as a numerical display; and (4) the light-incidence optical path number or the blocked optical path number is displayed as a numerical display.

According to the display method in the related art, an overview of the number of blocked optical paths and the locations thereof can be generally known, but the information to identify the locations is not displayed and thus it is hard for the user to identify them. For example, when a special function such as a blanking function is set for a specific optical path by teaching the apparatus this function, it is difficult to determine whether or not the function is correctly set for the intended optical path on the display section in the related art device.

For example, according to the display section in the related art, when using a numerical display, the blocked optical path number can be checked. However, when the blanking function is set for a plurality of optical paths, the optical path numbers where the blanking function is set need to be displayed individually and since all of the optical paths cannot be checked immediately at a glance this causes a problem.

When a plurality of multi-optical-path photoelectric sensor units are joined, to check a light blocked condition, etc., in the optical paths contained in each unit, it becomes necessary to separately check the display section of the corresponding unit. Depending on the installation location, it is also possible that this requirement for checking many units is cumbersome. Another problem is that it difficult to keep track of the light incidence/light block state for the whole system.

SUMMARY OF THE INVENTION

It is therefore an object of the invention to provide a display monitor for a multi-optical-path photoelectric safety apparatus for enabling the user to easily check the light incidence/light block state for each of a large number of optical paths contained in the multi-optical-path photoelectric safety apparatus, and a multi-optical-path photoelectric safety apparatus with the display monitor.

It is another object of the invention to provide a display monitor for a multi-optical-path photoelectric safety apparatus for enabling the user to easily check the setup state of a special function for each optical path if the multi-optical-path photoelectric safety apparatus includes a special function that can be selectively set for each optical path by the user. It is also an object to provide a multi-optical-path photoelectric safety apparatus with such a display monitor.

To solve the above-described problems, according to a first aspect of the invention, there is provided a display monitor for a multi-optical-path photoelectric safety apparatus having a multi-optical-path photoelectric sensor unit that includes a light emitter comprising a plurality of light emission elements and a light receiver having a corresponding number of light reception elements as the plurality of light emission elements, the light emission elements and the light reception elements forming a plurality of optical paths, said display monitor comprising: a first display section having a plurality of indicator lamps that indicate a light incidence/light block status condition for each of the plurality of optical paths; and a first switch section for selecting an optical path area from among optical path areas into which the plurality of optical paths are grouped with the number of the indicator lamps of the first display section, wherein the optical path area is selected by operating the first switch section and information concerning the light incidence/light block status condition of the optical paths in the selected optical path area is displayed on the first display section.

In the above-mentioned display monitor, it is preferable that the multi-optical-path photoelectric safety apparatus has a special function that can be set for each optical path, and the display monitor further comprises: a third display section having a corresponding number of indicator lamps as the number of the indicator lamps in the first display section that indicate whether the special function is set for each of the optical paths of the multi-optical-path photoelectric sensor unit, and the third display section indicates whether the special function is set for the optical paths contained in the selected optical path area.

To solve the above-described problems, according to a second aspect of the invention, there is provided a display monitor for a multi-optical-path photoelectric safety apparatus having a plurality of multi-optical-path photoelectric sensor units, each of the multi-optical-path photoelectric sensor units includes a light emitter comprising a plurality of light emission elements and a light receiver having a corresponding number of light reception elements as the plurality of light emission elements, the multi-optical-path photoelectric safety apparatus having a special function that can be set for each optical path of each unit, said display monitor comprising: a light incidence/light block status indicator lamp group including a plurality of indicator lamps each indicating a light incidence/light block state for each of the optical paths in one of optical path areas into which the optical paths in the multi-optical-path photoelectric safety apparatus are grouped; a mode state indicator lamp group having a corresponding number of indicator lamps as the plurality of indicator lamps of the light incidence/light block status indicator lamp group for displaying a setup state of the special function for each of the optical paths in the optical path area; a first selection section for selecting the unit to be displayed on the light incidence/light block status indicator lamp group and the mode state indicator lamp group from among the plurality of multi-optical-path photoelectric sensor units; a first group of indicator lamps for displaying the unit selected by using the first selection section; a second selection section for selecting the optical path area; a second group of indicator lamps for displaying the optical path area selected by using the second selection section; a third selection section for selecting the special function to be displayed on said display monitor; and a third group of indicator lamps for displaying the special function selected by using the third selection section.

To solve the above-described problems, according to a third aspect of the invention, there is provided a multi-optical-path photoelectric safety apparatus comprising: a multi-optical-path photoelectric sensor unit having a light emitter comprising a plurality of light emission elements and a light receiver comprising a corresponding number of light reception elements as the plurality of light emission elements in the light emitter, the light emission elements and the light reception elements forming a plurality of optical paths; and a control unit with a display monitor for receiving light incidence/light block information for each optical path from the multi-optical-path photoelectric sensor unit and displaying the light incidence/light block information for each optical path on the display monitor, said display monitor including: a first display section having a plurality of indicator lamps each that indicate a light incidence/light block status condition for each of the optical paths; and a first switch section for selecting an optical path area from among optical path areas into which the plurality of optical paths are grouped with the number of the indicator lamps of the first display section, wherein the optical path area is selected by operating the first switch section and information concerning light incidence/light block status condition of the optical paths in the selected optical path area is displayed on the first display section.

To solve the above-described problems, according to a fourth aspect of the invention, there is provided a display monitor for a multi-optical-path photoelectric safety apparatus having a multi-optical-path photoelectric sensor unit that includes a light emitter comprising a plurality of light emission elements and a light receiver having a corresponding number of light reception elements as the plurality of light emission elements, the light emission elements and the light reception elements forming a plurality of optical paths, said display monitor comprising: first display means having a plurality of indicator lamps that indicate a light incidence/ light block status condition for each of the plurality of optical paths; and first switch means for selecting an optical path area from among optical path areas into which the plurality of optical paths are grouped with the number of the indicator lamps of the first display means, wherein the optical path area is selected by operating the first switch means and information concerning the light incidence/light block status condition of the optical paths in the selected optical path area is displayed on the first display means.

These and other objects and advantages of the invention will become more apparent as the detailed description of a preferred embodiment of the invention proceeds.

DETAILED DESCRIPTION OF THE PREFERRED EMBODIMENTS

Figure 1:
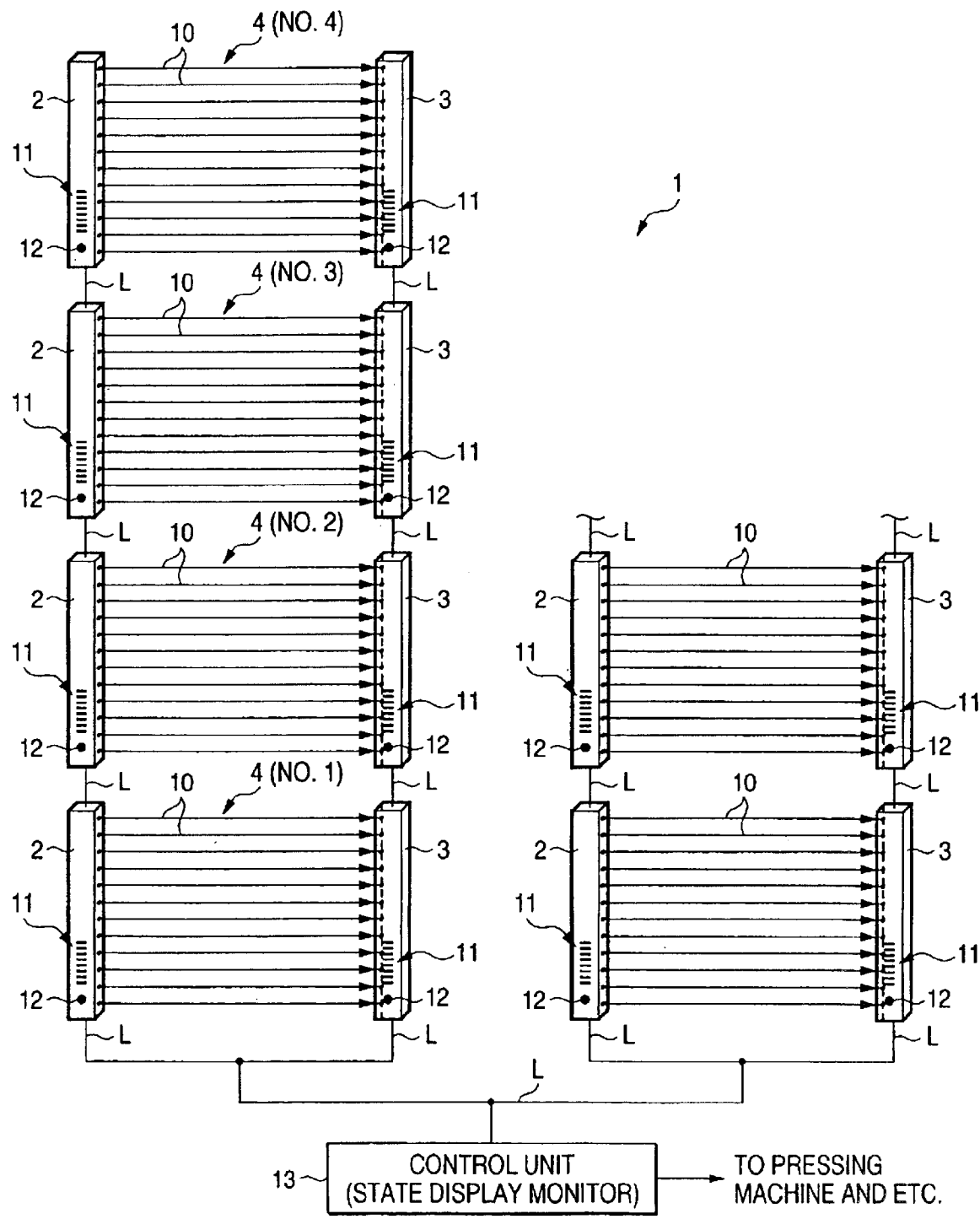
FIG. 1 is an illustration of the whole outline of a multi-optical-path photoelectric safety apparatus having a plurality of multi-optical-path photoelectric sensor units, connected in series with a control unit, and including a display monitor according to the present invention.

Referring to FIG. 1, a multi-optical-path photoelectric safety apparatus 10 of a first embodiment includes a multi-optical-path photoelectric sensor unit 4 comprising a light emitter 2 and a light receiver 3. Additional units 4 can be installed in series or in parallel via communication lines or signal lines L.

The light emitter 2 has an elongated case in which N light emission elements 5 (FIGS. 2 and 3) are equally spaced from each other in a row along the lengthwise direction of the case. The spacing between the adjacent light emission elements 5 is not limited and can be, 20 mm. for example.

The light receiver 3 has an elongated case in which as many light reception elements 6 (FIGS. 2 and 4) as the number of the light emission elements 5 are equally spaced from each other in a row along the lengthwise direction of the case. The spacing between the adjacent light reception elements 6 is the same as the spacing between the adjacent light emission elements 5 of the light emitter 2 mentioned above.

The light emitter 2 and the light receiver 3 are placed facing each other on the same plane. A light beam is emitted from each light emission element 5 of the light emitter 2 to the light reception element 6 of the light receiver 3 that corresponds to the particular light emission element 5. This forms a light curtain between the light emitter 2 and the light receiver 3. FIG. 1 also shows an optical path 10.

Each of the light emitter 2 and the light receiver 3 is provided with an optical path adjustment display section 11 comprising a plurality of adjacent light emitting diode (LED) segments placed up and down. The optical path adjustment display section 11 may be provided on either the light emitter 2 or the light receiver 3. The LED segments of the optical path adjustment display section 11 are implemented as two-color light emitting diodes that emit, for example, red or green light.

Preferably, each of the light emitter 2 and the light receiver 3 has an output indicator lamp 12 implemented as an LED for emitting, for example, green light when the sensed condition is normal and emitting red light at any time other than when the sensed condition is normal, for example, this can be when an optical path not intended is blocked or is incident or when the system itself fails. Either the light emitter 2 or the light receiver 3 may be provided with the output indicator lamp 12.

The display mode of the optical path adjustment display section 11 is not limited. When all of the optical paths or light beams are incident on the light receiver 3, all LED segments emit green light. The optical path adjustment display section 11 operates in such a manner that when some of the optical paths are blocked, segments representing the percentage of the light-incidence optical paths emit red light from the bottom and segments representing the percentage of the blocked optical paths turn off starting from the top. For example, the red bar extends upwardly in response to an increase in the light incidence percentage or the optical path adjustment degree. The ratio between the number of the blocked optical paths and the number of the light-incidence optical paths can be used to produce the bar display. Preferably, the optical path adjustment display section 11 adapts to any of the following display modes:

(1) An indicator lamp which goes on or off when all optical paths are incident and the optical path adjustment is complete;
(2) An indicator lamp whose color changes from red to green, for example, when all optical paths are incident and the optical path adjustment is complete;
(3) An indicator lamp where the number of LEDs are increased or decreased in response to the magnitude of the light reception amount of the light receiver 3;
(4) An indicator lamp whose blinking speed changes in response to the ratio between the number of blocked optical paths and the number of light-incidence optical paths;
(5) An indicator lamp whose blinking speed changes in response to the magnitude of the light reception amount of the light receiver 3.

As a modification, the optical path adjustment display section 11 may be a liquid crystal display or a seven-segment LED for numerically displaying the number of blocked optical paths or the number of light-incidence optical paths or the ratio between the number of blocked optical paths and the number of light-incidence optical paths.

The multi-optical-path photoelectric safety apparatus 1 includes a control unit 13 (FIGS. 1 and 5) and this control unit 13 includes a display state monitor 14 (FIG. 6) described later in detail.

Figure 2:
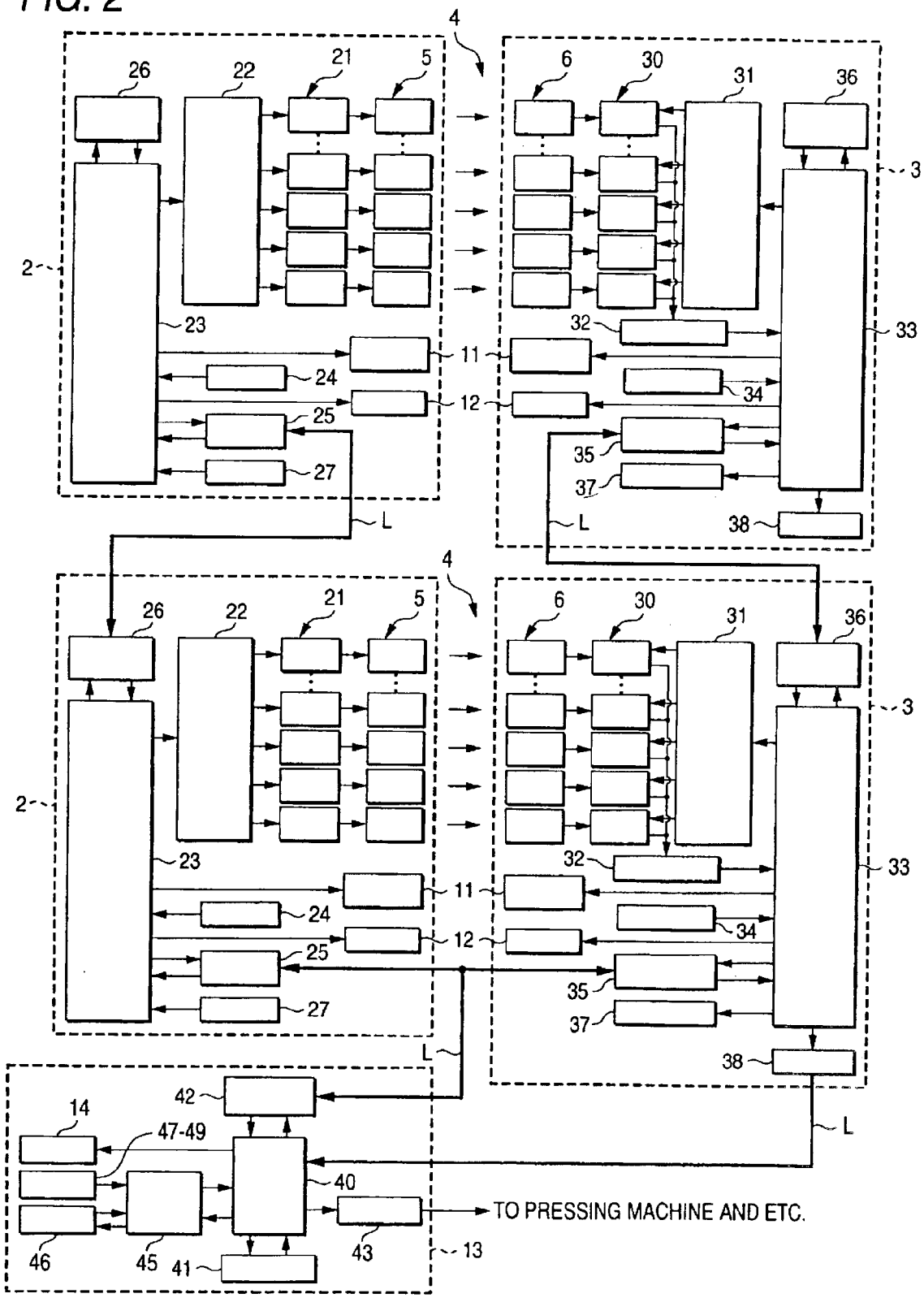
FIG. 2 is a block diagram showing the general configuration of the control unit including the display monitor and a plurality of multi-optical-path photoelectric sensor units connected in series with the control unit according to the present invention.
Figure 3:
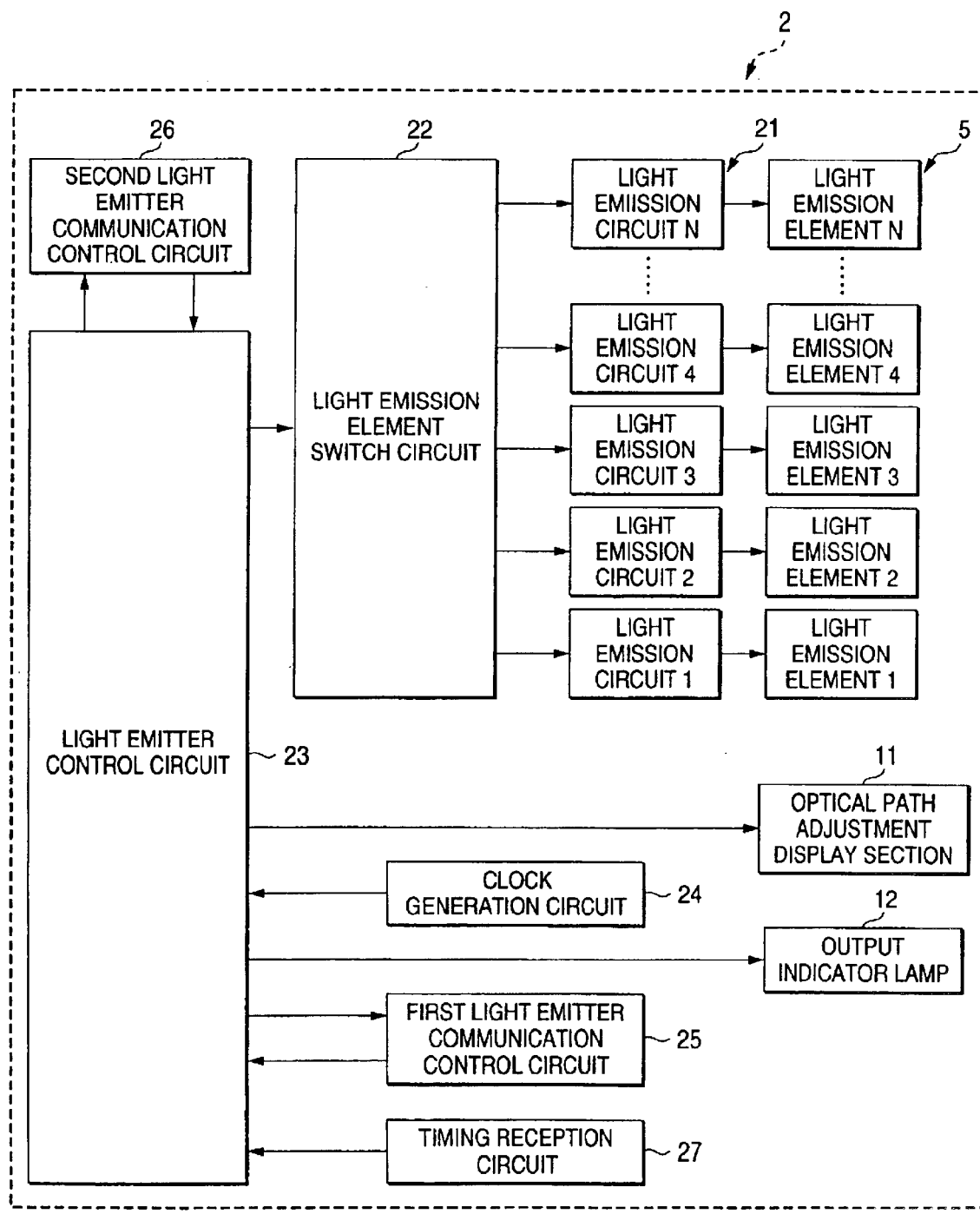
FIG. 3 is a block diagram of an example of a light emitter forming a part of the multi-optical-path photoelectric sensor unit according to an embodiment of the present invention.
Figure 4:
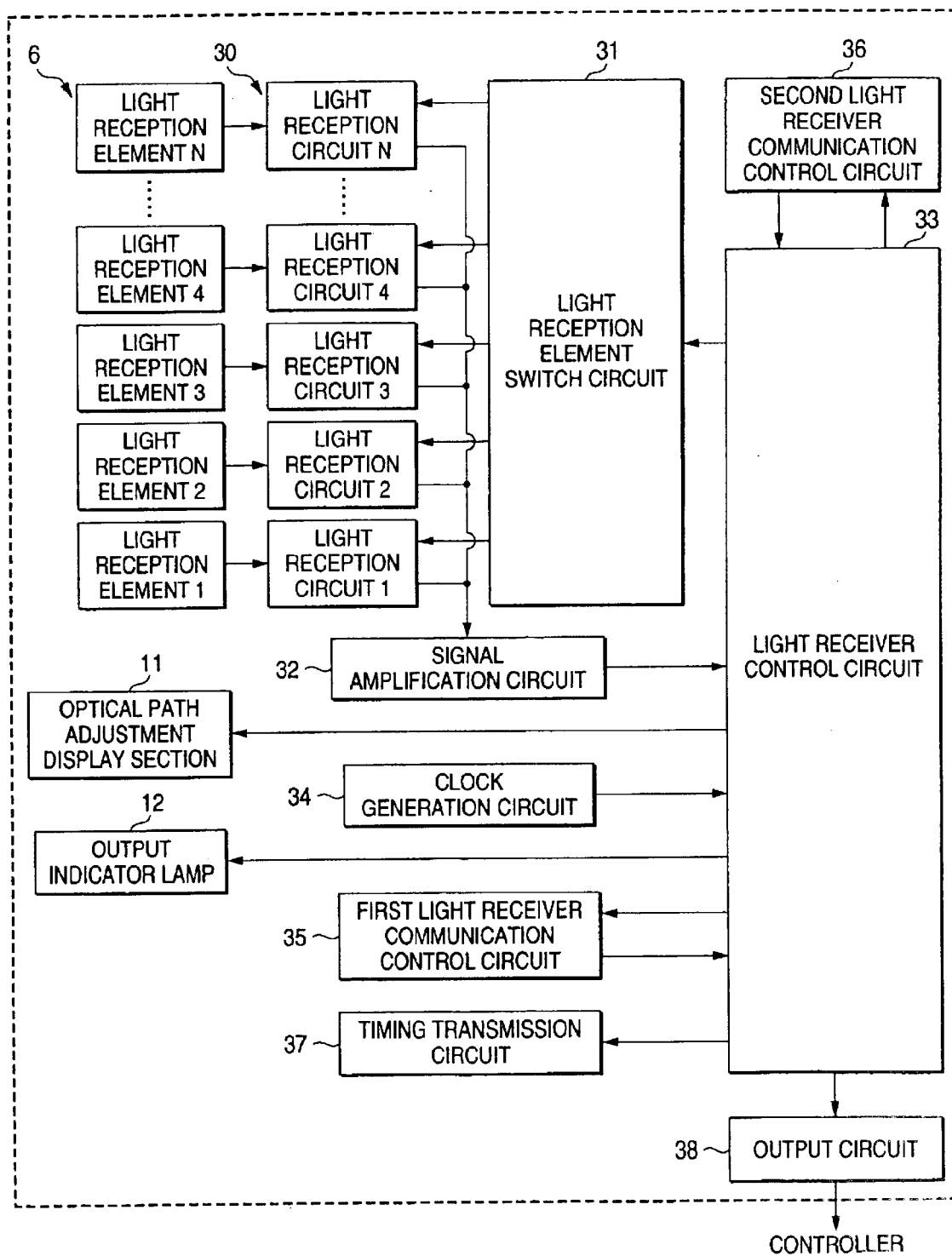
FIG. 4 is a block diagram of an example of a light receiver forming a part of the multi-optical-path photoelectric sensor unit according to an embodiment of the present invention.
Figure 5:
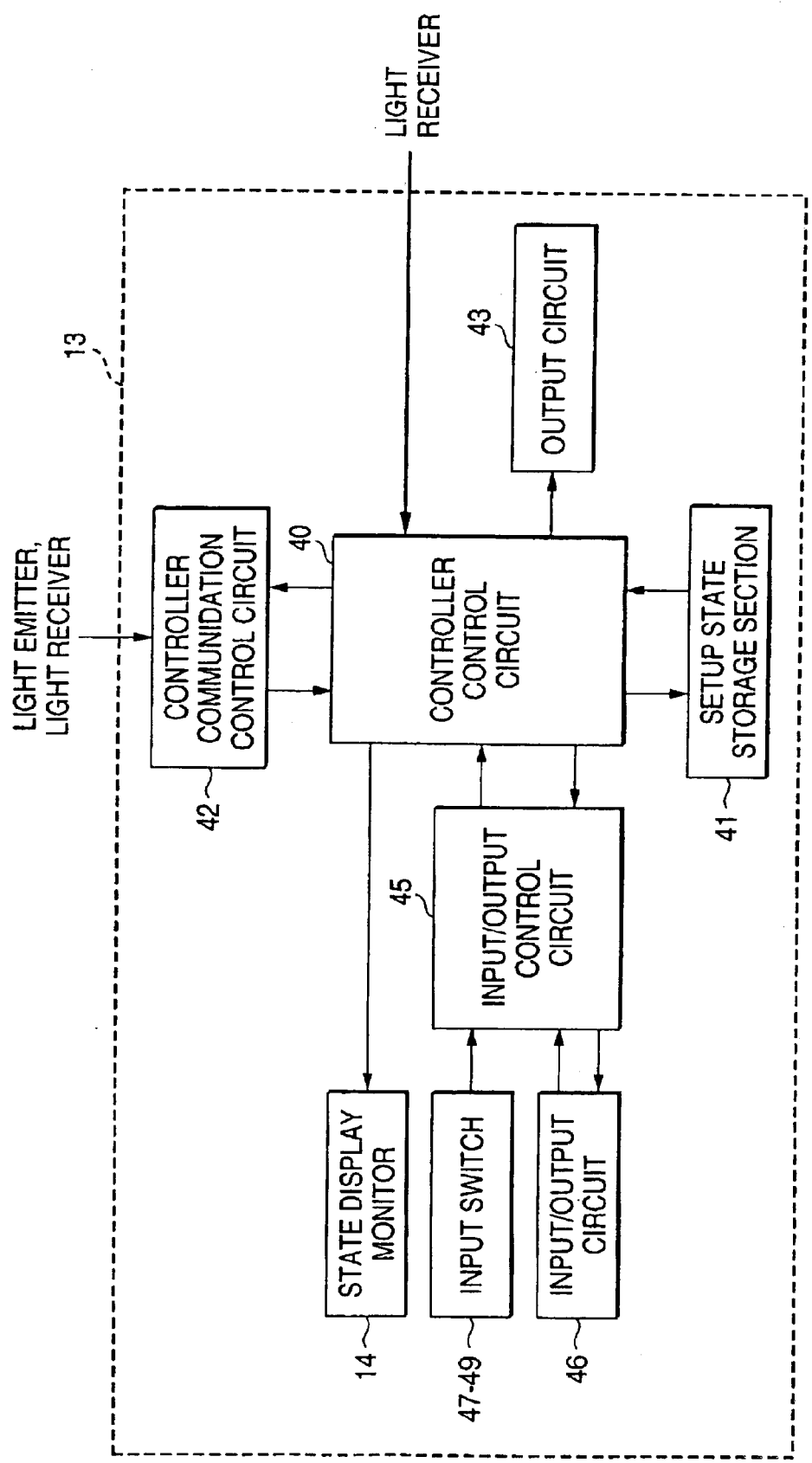
FIG. 5 is a block diagram of an example of a control unit forming a part of the multi-optical-path photoelectric sensor unit according to an embodiment of the present invention.

FIGS. 2 to 5 are block diagrams related to the multi-optical-path photoelectric safety apparatus 1. FIG. 2 is a block diagram showing the general configuration of the multi-optical-path photoelectric safety apparatus 1. FIG. 3 is a block diagram of the light emitter 2. FIG. 4 is a block diagram of the light receiver 3. FIG. 5 is a block diagram of the control unit 13. Referring particularly to FIG. 3, the light emitter 2 comprises N light emission circuits 21, a light emission element switch circuit 22, and a light emitter control circuit 23. The light emission circuits 21 drive the light emission elements 5 implemented as N light emitting diodes, etc. The light emission element switch circuit 22 scans the light emission circuits 21 in a time divided manner. The light emitter control circuit 23 controls the entire light emitter 2. A control signal is output from the light emitter control circuit 23 to the optical path adjustment display section 11 and the output indicator lamp 12.

A clock signal from a clock generation circuit 24 is input to the light emitter control circuit 23 for generating the light emission timing for causing N light emission elements 5 to emit light in order. For example, in FIG. 2, N light emission elements 5 emit a light beam in a predetermined timing in an order from the bottom light emission element 5 to the top light emission element 5.

The light emitter 2 further comprises a first light emitter communication control circuit 25, a second light emitter communication control circuit 26, and a timing reception circuit 27. The first light emitter communication control circuit 25 controls the bi-directional signal transmission and reception, to and from, the light receiver 3 and the control unit 13 or the light emitter 2 of any other sensor unit. The second light emitter communication control circuit 26 controls communications with the light emitter 2 of any other sensor unit connected in series with the sensor unit. The timing reception circuit 27 receives a timing signal from the light receiver 3 and/or the control unit 13.

On the other hand, referring particularly to FIG. 4, the light receiver 3 comprises N light reception circuits 30, a light reception element switch circuit 31, an amplification circuit 32, and a light receiver control circuit 33. The light reception circuits 30 drive the light reception elements 6 implemented as N light emitting diodes, etc. The light reception element switch circuit 31 scans the light reception circuits 30 in a time divided manner. The light receiver control circuit 33 controls the entire light receiver 3. A control signal is output from the light receiver control circuit 33 to the optical path adjustment display section 11 and the output indicator lamp 12.

A signal from a clock generation circuit 34 is input to the light receiver control circuit 33 for enabling the N light reception elements 6 to receive light in order and disable any other elements 6 from receiving light, other than the selected light reception elements 6. For example, in FIG. 1, a state in which light can be received based on a predetermined timing is generated for the N light reception elements 6 in an order from the bottom light reception element 6 to the top light reception element 6.

The light receiver 3 further comprises a first light receiver communication control circuit 35, a second light receiver communication control circuit 36, and a timing transmission circuit 37. The first light receiver communication control circuit 35 controls the bi-directional signal transmission and reception, to and from, the light transmitter 2 or the light receiver 3 of any other sensor unit connected in series to the sensor unit. The second light receiver communication control circuit 36 controls communications with the light receiver 3 of any other sensor unit connected in series to the sensor unit. The timing transmission circuit 37 transmits a timing signal to the light emitter 2. A light block signal generated in the light receiver control circuit 33 is sent through an output circuit 38 to the control unit 13. From the control unit 13, the signal is sent to an external machine (not shown), such as a control unit of a pressing machine or a warning lamp. The external machine is surrounded by the light curtain formed by the light emitter 2 and the light receiver 3 and typically the operation of the machine is stopped immediately. As a modification of this device, the light block signal generated in the light receiver control circuit 33 may be sent directly to an external machine, such as a control unit of a pressing machine or a warning lamp, and not from the control unit 13.

Referring particularly to FIG. 5, the control unit 13 includes a controller control circuit 40, a setup state storage circuit 41, and a controller communication control circuit 42 for controlling the bi-directional signal transmission and reception, to and from, the light transmitter 2 and the light receiver 3. The light block signal from the output circuit 38 of the light receiver 3 is input to the controller control circuit 40. The controller control circuit 40 outputs the signal via an output circuit 43 to the external machine, such as the control unit of the pressing machine or the warning lamp, as described above.

Figure 7:
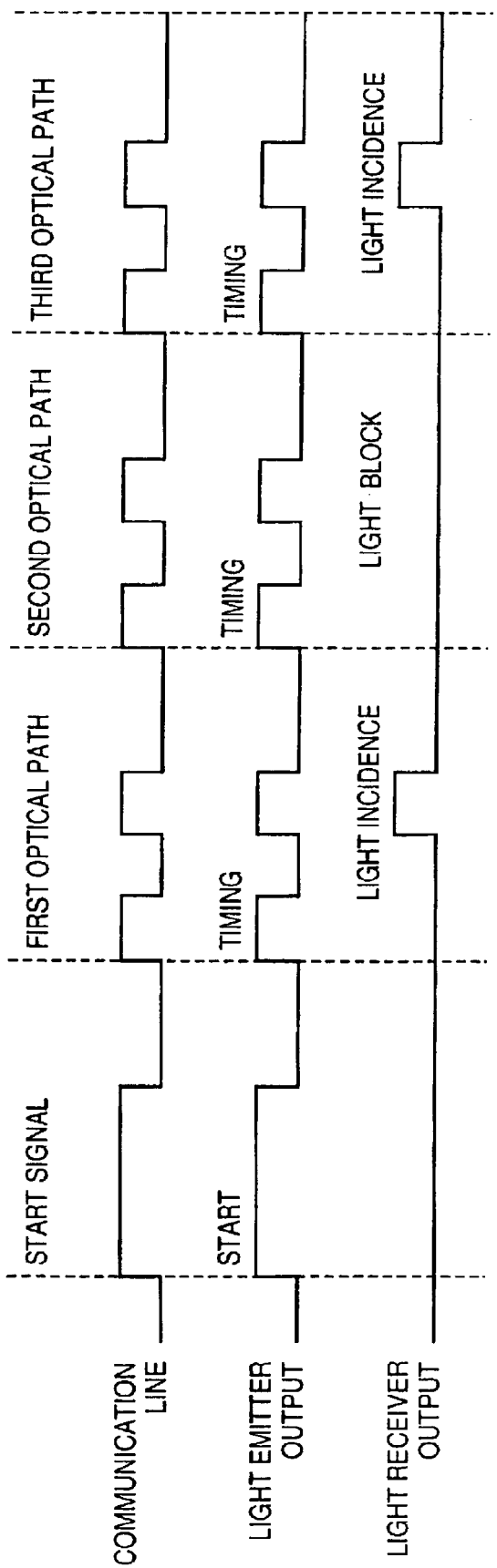
FIG. 7 is a chart to describe communications and signals between the multi-optical-path photoelectric sensor unit and the control unit according to an embodiment of the present invention.

Information indicating the number of sensor units 4 connected to the control unit 13 and light incidence/light block information for each optical path are transmitted from the light receiver 3 via the communication line(s) or signal line(s) L to the control unit 13. Synchronous timing is transmitted from the light emitter 2 through the communication line(s) or signal line(s) L to the light receiver 3 and the control unit 13. That is, the communication line(s) or the signal line(s) L is used not only for conducting communications among the light emitter 2, the light receiver 3, and the control unit 13, but also for transferring light incidence/light block information (FIG. 7). As seen in FIG. 7, a signal on the communication line(s) or the signal line(s) L is provided by combining the timing signal output from the light emitter 2 and light incidence/light block information signal output from the light receiver 3.

The control unit 13 also has the above-mentioned state display monitor 14, an input/output control circuit 45, and an input/output circuit 46. A signal from the first to third switches 47–49 (FIG. 6) for switching the display mode of the display monitor 14 is input to the input/output control circuit 45. A personal computer, a teaching mode switch, etc., (all not shown), can be connected to the input/output circuit 46.

Figure 6:
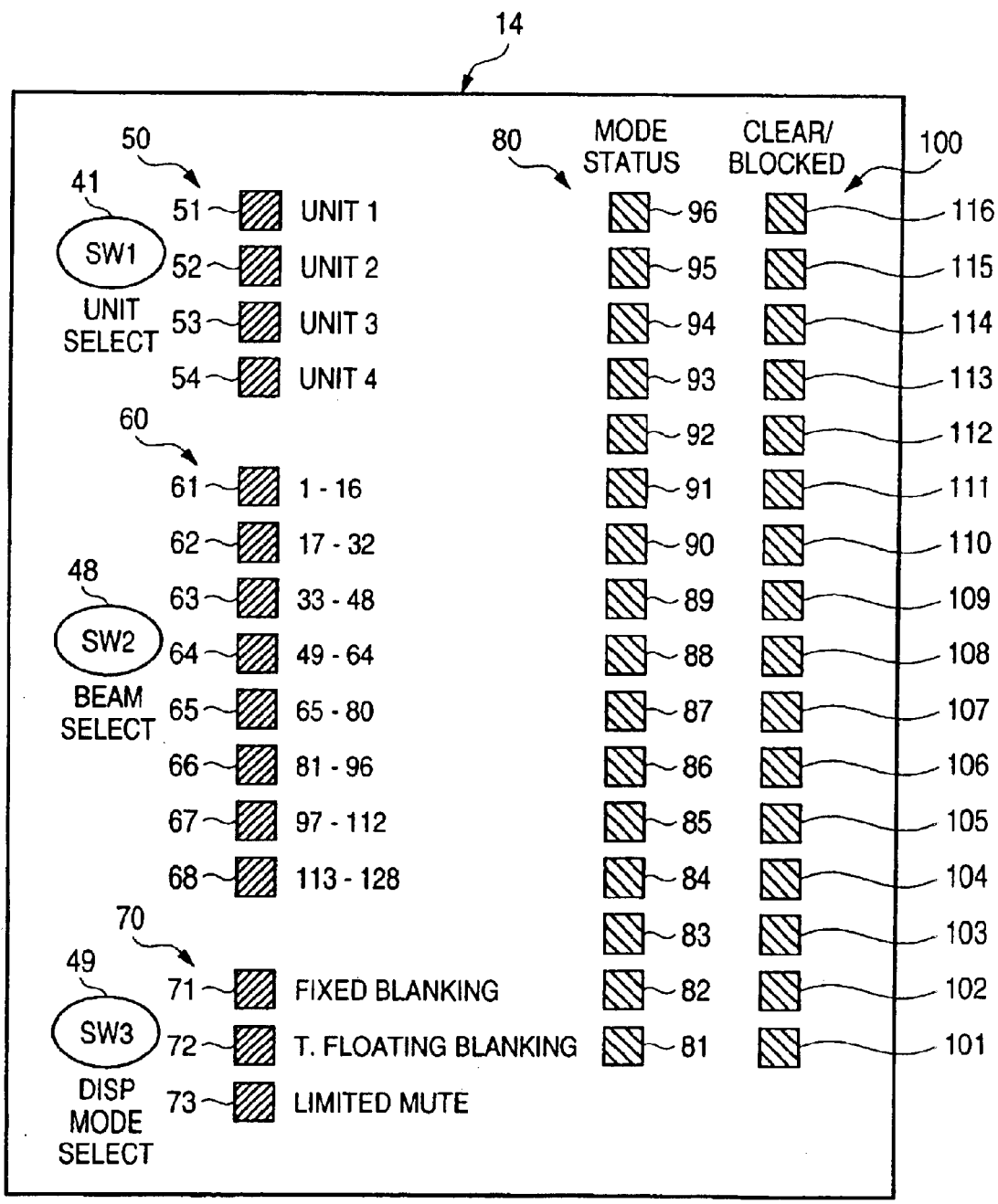
FIG. 6 is an illustration describing an example of a layout of switches and indicator lamps on the display monitor according to an embodiment of the present invention.

The first to third switches 47–49 on the control unit 13 are preferably spaced from each other in the longitudinal direction and the state display monitor 14 is provided in the area to the right of the first to third switches 47–49, as seen in FIG. 6.

The state display monitor 14 having a preferred arrangement of four multi-optical-path photoelectric sensor units 4 will be discussed. Each sensor unit 4 has 16 optical paths (the number of both the light emission elements and light reception elements) contained in the light emitter 2 (and light receiver 3) and are placed in series.

The state display monitor 14 includes a display means 51–54 implemented as a first group of LED indicator lamps 50. The indicator lamps 51–54 of the first group 50 are located to the right of the first switch 47; the four indicator lamps 51–54 are spaced a little from each other and are preferably disposed in a row in the longitudinal direction. To the right of the second switch 48, a display means 61–68, such as eight indicator lamps of a second group 60, are spaced a little from each other. They are also preferably disposed in a row in the longitudinal direction. To the right of the third switch 49, a display means 71–73, such as three indicator lamps of a third group 70, are spaced a little from each other. They are also preferably disposed in a row in the longitudinal direction.

The indicator lamps of the first to third groups 50, 60, and 70 may be offset a little, but preferably they are aligned in a row in the longitudinal direction to improve vision, etc. The functions of the first to third switches 47–49 and the indicator lamps 51–54, 61–68, and 71–73 will be discussed later.

A mode state indicator lamp group 80 is made up of a plurality of LEDs and is located to the right of the indicator lamps of the first to third groups. The mode state indicator lamp group 80 is not particularly limited. In the embodiment shown, the basic unit is made up of 16 LED indicator lamps 81–96 for the number of optical paths, and they are preferably placed in a row in the longitudinal direction.

A light incidence/light block state indicator lamp group 100 is made up of a display means having a plurality of LEDs located to the right of the mode state indicator lamp group 80. The light incidence/light block state indicator lamp group 100 is also not particularly limited. In the embodiment, the basic unit is made up of 16 LED indicator lamps 101–116 for the number of optical paths, and they are preferably placed in a row in the longitudinal direction.

The first switch 47 provides a selection means for enabling the user to select the desired unit to be displayed on the state display monitor 14. That is, assuming that information concerning the first unit 4 (No. 1) is presently displayed, if the user presses the first switch 47, the display is switched to display information concerning the second unit 4 (No. 2). When the user presses the first switch 47 again, the display is switched to display information concerning the third unit 4 (No. 3). When the user presses the first switch 47 another time, the display is switched to display information concerning the fourth unit 4 (No. 4). Then as the user presses the first switch 47 again, the display is returned to the information concerning the first unit 4 (No. 1).

The display showing which of the units 4, No. 1 to No. 4, is produced by using one of the four indicator lamps 51–54 of the first group 50. That is, the indicator lamps 51–54 are arranged in a row in the longitudinal direction and are assigned from top to bottom as follows: the indicator lamp 51 relates to the No. 1 unit, the indicator lamp 52 relates to the No. 2 unit, the indicator lamp 53 relates to the No. 3 unit, and the indicator lamp 54 relates to the No. 4 unit. To visually clarify the assignment in characters, identification symbols or letters such as UNIT 1, UNIT 2, UNIT 3, UNIT 4, etc., are preferably added to the right of or above or below each indicator lamp 51–54.

The indicator lamps 51–54 may be assigned to the units as desired and may be assigned from bottom to top in order as the No. 1 unit, the No. 2 unit, the No. 3 unit, and the No. 4 unit. When the indicator lamps contained in the first group 50 are placed side by side, the indicator lamps 51–54 may be assigned from right to left in an order as the No. 1 unit, the No. 2 unit, the No. 3 unit, and the No. 4 unit or they may be assigned from left to right in an order as the No. 1 unit, the No. 2 unit, the No. 3 unit, and the No. 4 unit.

The second switch 48 provides a selection means for selecting the optical path area indicated on the mode state indicator lamp group 80 and the light incidence/light block state indicator lamp group 100 in units of 16 optical paths (assuming that one unit comprises a maximum of 128 optical paths). That is, in the embodiment disclosed, each unit 4 comprises 16 optical paths and thus no problem is involved. If for example, the unit 4 comprises 64 optical paths, and assuming that the optical path area of the first block consists of the first optical path to the 16th optical path is selected, the mode state and the light incidence/light block state of each of the first optical path to the 16th optical path are displayed on the mode state indicator lamp group 80 and the light incidence/light block state indicator lamp group 100.

Next, when the user presses the second switch 48 again, the optical path area of the second block consists of the 17th optical path to the 32nd optical path and the mode state and the light incidence/light block state of each of the 17th optical path to the 32nd optical path are displayed on the mode state indicator lamp group 80 and the light incidence/light block state indicator lamp group 100. When the user presses the second switch 48 again, the optical path area of the third block consists of the 33rd optical path to the 48th optical path and the mode state and the light incidence/light block state of each of the 33rd optical path to the 48th optical path are displayed on the mode state indicator lamp group 80 and the light incidence/light block state indicator lamp group 100. When the user presses the second switch 48 another time, the optical path area of the fourth block consists of the 49th optical path to the 64th optical path and the mode state and the light incidence/light block state of each of the 49th optical path to the 64th optical path are displayed on the mode state indicator lamp group 80 and the light incidence/light block state indicator lamp group 100.

The first optical path to the 128th optical path are divided into eight blocks each consisting of 16 optical paths as the basic unit. The display of which optical paths are produced on the mode state indicator lamp group 80 and the light incidence/light block state indicator lamp group 100 is indicated by one of the eight indicator lamps 61–68 of the second group 60. That is, the indicator lamps 61–68 are arranged in a row in the longitudinal direction and are shown in an order from top to bottom in FIG. 6. The indicator lamp 61 is assigned to the first optical path area for the first to 16th optical paths. The indicator lamp 62 is assigned to the second optical path area for the 17th to 32nd optical paths. The indicator lamp 63 is assigned to the third optical path area for the 33rd to 48th optical paths. The indicator lamp 64 is assigned to the fourth optical path area for the 49th to 64th optical paths. The indicator lamp 65 is assigned to the fifth optical path area for the 65th to 80th optical paths. The indicator lamp 66 is assigned to the sixth optical path area for the 81st to 96th optical paths. The indicator lamp 67 is assigned to the seventh optical path area for the 97th to 112th optical paths. The indicator lamp 68 is assigned to the eighth optical path area for the 113th to 128th optical paths. To visually clarify the assignment of each indicator lamp 61–68, characters can be added near each indicator lamp 61–68. Preferably, identification symbols or letters, such as 1–16, 17–32, . . . , 113–128, are added to the right of or above or below each indicator lamp 61–68.

The indicator lamps 61–68 may be assigned to the desired optical paths and they may also be assigned in a reverse order from bottom to top. In this order the first to 16th optical paths, the 17th to 32nd optical paths, . . . , the 113th to 128th optical paths are numbered from indicator lamp 68. It is also possible to dispose the indicator lamps in the second group 60 side by side. For example, the indicator lamps 61–68 may be assigned in an order from right to left starting with the first to 16th optical paths, the 17th to 32nd optical paths, . . . , the 113th to 128th optical paths. They may also be assigned in an order from left to right starting with the first to 16th optical paths, the 17th to 32nd optical paths, . . . , the 113th to 128th optical paths.

The third switch 49 is a selection switch for producing a display relating to any number of special functions of the multi-optical-path photoelectric safety apparatus 1. These desired functions for each optical path can be set by the user on the mode state indicator lamp group 80. In this embodiment there are three special functions. Specifically, the multi-optical-path photoelectric safety apparatus 1 has a fixed blanking function (Fixed Blanking), a floating blanking function (Floating Blanking), and a limited mute function (Limited Mute) as the special functions. The third switch 49 provides a means for selecting the special function to be displayed from among these three special functions. Each of the special functions of the multi-optical-path photoelectric safety apparatus 1 can be set for all detection areas of the light curtain, namely, all optical paths. They may also be set for any desired limited area.

If a fixed obstacle exists for example, in the light curtain, the fixed blanking function is a function for changing the optical path logic in the area where the obstacle exists so that the presence of the obstacle in the area is ignored. This means that the blanking function is a function for changing the optical path logic so that the ON state is entered when light is blocked. For example, if a part of a pressing machine always interferes with the third to seventh optical paths, the fixed blanking function is set for the third to seventh optical paths. This can be done, for example, by teaching, so that the multi-optical-path photoelectric safety apparatus 1 does not output a stop signal to the pressing machine even if the third to seventh optical paths are blocked.

Additionally, if a worker inserts a workpiece such as a rod material into a pressing machine while holding the workpiece, the floating blanking function is a function for not stopping the pressing machine until contiguous optical paths, typically two adjacent optical paths, are blocked. The floating blanking function can be set for all detection areas of the light curtain. It can also be set for only the area into which the workpiece will be inserted. In this case, if one optical path in any other area experiences a light block state, a light block signal for stopping the pressing machine is immediately output.

The floating blanking function can also be set only in a partial detection area of the light curtain, for example, by teaching.

In another example, the light curtain is installed across a belt conveyor for transporting a workpiece. In this example, the limited muting function is a function that ignores the presence of the workpiece transported on the belt conveyor when the area where the workpiece passes through the light curtain is set by teaching. The limited muting function can also be set only in a partial detection area of the light curtain, for example, by teaching.

When the user presses the third switch 49, the mode state indicator lamp group 80 indicates whether or not the first function is set for each optical path. When the user further presses the third switch 49, the mode state indicator lamp group 80 indicates whether or not the second function is set for each optical path. When the user further continues to press the third switch 49, the mode state indicator lamp group 80 indicates whether or not the third function is set for each optical path.

FIG. 1 shows the case where four 16-optical-path photoelectric sensor units 4 are connected in series. The rightmost light incidence/light block state indicator lamp group 100 indicates the light incidence or light block state of each of the first to 16th optical paths for each unit. The unit currently displayed on the light incidence/light block state indicator lamp group 100 can be checked by looking at the first indicator lamp group 50.

The light incidence/light block information is always supplied from the light receiver 3 to the control unit 13 through the communication line(s) or signal line(s) L during operation. This allows the state display monitor 14 of the control unit 13 to be updated in real time. Thus, the light incidence/light block state indicator lamp group 100 indicates the light incidence or light block state of each of the first to 16th optical paths in real time.

In the mode state, information such as whether or not a special function is set, is stored in an EEPROM. For example, in the control unit 13, and the mode state indicator lamp group 80 indicates the mode based on the stored information.

Figure 8:
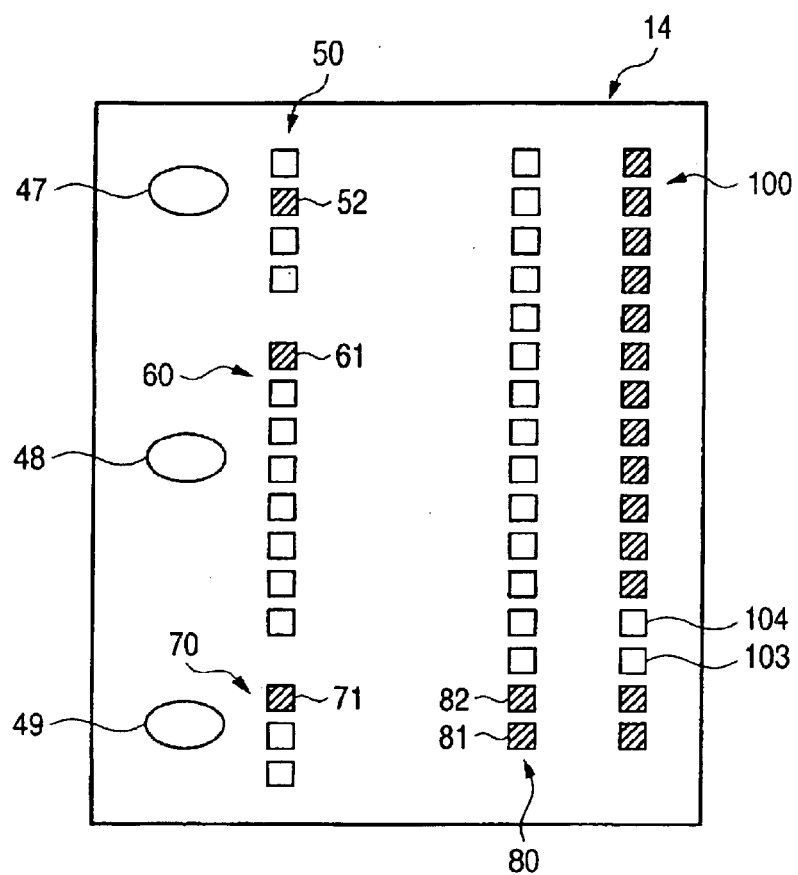
FIG. 8 is a drawing to show a display form of the display monitor according to an embodiment of the present invention at one instant in time.

The meanings of the display on the monitor 14 will now be specifically discussed by using the display in FIG. 8 as an example. FIG. 8 shows photoelectric sensor units 4 each comprising 16 optical paths.

The indicator lamps of the first group 50 located to the right of the first switch 47 show that the second indicator lamp 52 is on. Accordingly, it is seen from the display on the monitor 14 that the No. 2 unit is on.

Also, the indicator lamps of the second group 60 located to the right of the second switch 48 show that the top indicator lamp 61 is on. Accordingly, this means that the display is related to the first to 16th optical paths of the No. 2 unit.

By reading the indicator lamps of the third group 70 located to the right of the third switch 49, they show that the top indicator lamp 71 is on. Accordingly, this means that the display of the mode state indicator lamp group 80 on the monitor 14 relates to the first special function (fixed blanking function).

As can be seen by the indicator lamps of the mode state indicator lamp group 80, the two bottom indicator lamps 81 and 82 are on. Accordingly, this means that the fixed blanking function is set for the first and second optical paths of the No. 2 unit. To check the setup state of any other special functions, the third switch 49 may be operated.

As can be seen by the indicator lamps of the light incidence/light block state indicator lamp group 100, the third and fourth indicator lamps 103 and 104 are off and the other indicator lamps are on. Accordingly, it is seen that the third and fourth optical paths of the No. 2 unit 4 are blocked.

Figure 9:
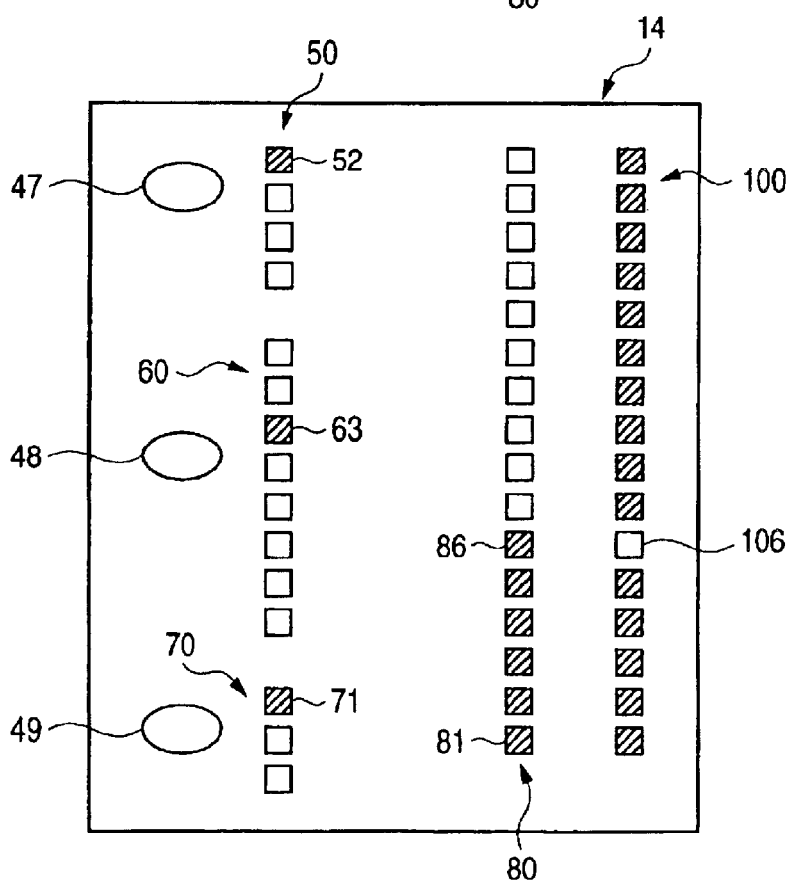
FIG. 9 is a drawing to show a display form of the display monitor according to an embodiment of the present invention at another instant in time.

FIG. 9 shows another example of the display of the state display monitor 14. FIG. 9 shows photoelectric sensor units 4 each comprising 64 optical paths.

The indicator lamps of the first group 50 located to the right of the first switch 47, show that the top indicator lamp 51 is on. Accordingly, it is seen from the display on the monitor 14 that the No. 1 unit is shown.

Also, seeing the indicator lamps of the second group 60 located to the right of the second switch 48, show that the third indicator lamp 63 is on. Accordingly, this means that the displays are related to the 33rd to 48th optical paths of the No. 1 unit 4.

The indicator lamps of the third group 70 located to the right of the third switch 49 show that the top indicator lamp 71 is on. Accordingly, this means that the display of the mode state indicator lamp group 80 on the monitor 14 relates to the first special function (fixed blanking).

As can be seen by the indicator lamps of the mode state indicator lamp group 80, the six bottom indicator lamps 81 to 86 are on. Accordingly, this means that the fixed blanking function is set for the 33rd to 38th optical paths of the No. 1 unit. To check the setup state of any other special functions, the third switch 49 may be operated.

As can be seen by the indicator lamps of the light incidence/light block state indicator lamp group 100, the sixth indicator lamp 106 (the indicator lamp related to the 38th optical path) is off and the other indicator lamps are on. The fixed blanking function is set for the 38th optical path and the logic is inverted. Therefore the fact that the indicator lamp 106 that corresponds to the 38th optical path is off, means that the 38th optical path (which should not be incident on the light receiver 3) is incident on the light receiver 3. Accordingly, the user knows that a teaching error has occurred for the 38th optical path. This means that the setting of the blanking function for the 38th optical path is erroneous. The user then recognizes that the blanking function for the 38th optical path needs to be set again.

The second switch 48 may be operated to check the light incidence/light block state of each of the other optical paths of the No. 1 unit.

If the mode state indicator lamp group 80 and the light incidence/light block state indicator lamp group 100 are each provided with the same number of indicator lamps as the number of optical paths in the 64-optical-path photoelectric sensor unit 4 then to check all of the optical paths of the photoelectric sensor unit 4, the display area of the monitor 14 would become extremely large and the cost and the electric current consumption would increase. This problem can be solved by limiting the basic area of display (the number of optical paths) and requesting the user to select the area to be displayed as described in this invention. In other words, according to the present invention the monitor 14 can be provided so that it can deal with a unit 4 comprising any number of optical paths.

If there exists a blocked optical path or if an optical path has a special function set in unselected units or optical paths, for example another optical path for the No. 1 unit, such as the first to 16th optical paths, or the second to fourth units, these aspects can be visually shown by repeatedly blinking or turning on a different color in the indicator lamp (first indicator lamp group 50) of the unit number containing the optical path and the optical path area (second display lamp group 60) or the corresponding indicator lamp in the third indicator lamp group 70. When the user sees this, they can immediately know the details related to the optical path or unit that should be checked by operating the first to third switches 47 to 49.

As described above, the state display (indication) is produced by turning on or off the LED in each indicator lamp group. It is also possible to change the LED color, for example, from green to red or from red to green.

As understood from this description, according to the multi-optical-path photoelectric safety apparatus 1 according to the invention, the light incidence/light block state and/or the setup state of the special functions in a plurality of multi-optical-path photoelectric sensor units 4 added in series can be extensively managed by the single monitor 14. If the number of optical paths contained in a single multi-optical-path photoelectric sensor unit 4 varies from one sensor unit 4 to another, the optical path area to be displayed can be selected so as to display the information for all optical paths. In other words, if the multi-optical-path photoelectric sensor unit 4 comprises a large number of optical paths, the same number of indicator lamps as the number of optical paths need not be provided.

For example, which unit and/or which optical path area the special function is set for and/or which unit and/or which optical path area is placed in the light block state is indicated by blinking the indicator lamps. This allows the user to immediately understand an overview of the status of the device. To check the details, the user can select the unit and/or optical path area corresponding to the blinking LED by operating the switches 47 to 49 and immediately check into the details of the situation. Typically, after the special function has been set by teaching the device, the fact that the special function is made effective for a predetermined optical path without an error can be checked. In addition, the light incidence/light block information is updated in real time and thus the user can set the special function after checking the display containing the light incidence/light block information.

A personal computer may also be used as the control unit 13 and the state display monitor 14 may be produced by software for the personal computer, as will be described below. The switches 47 to 49 may be mechanical switches or they may be implemented as a touch panel of a display screen.

If a plurality of rows of sensor units 4 are placed side by side, the state display monitor 14 may be provided with a switch for the user to select which specific row of sensor units from among the plurality of rows of sensor units 4 should be displayed.

Figure 10:
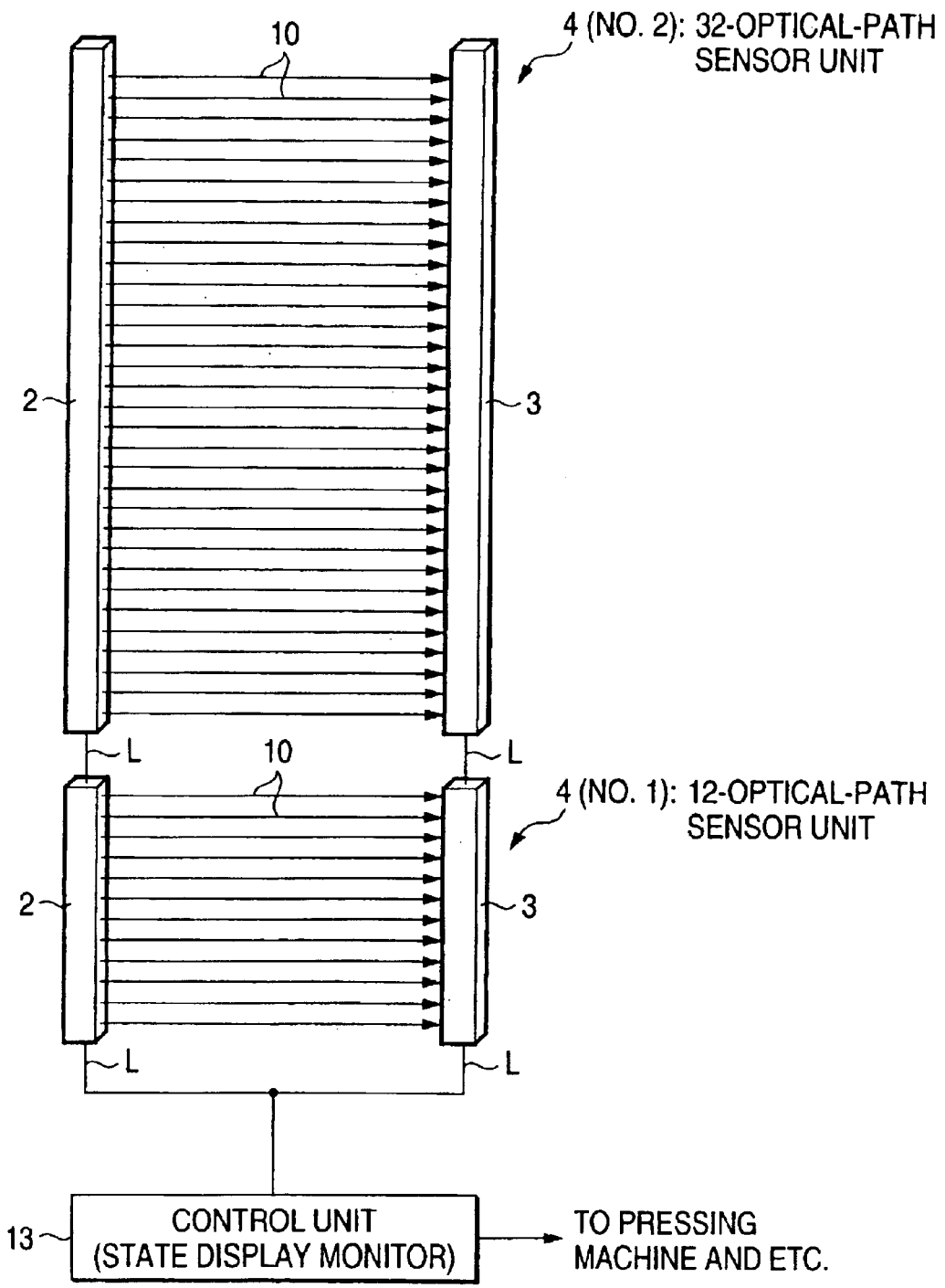
FIG. 10 shows a general outline of the multi-optical-path photoelectric safety apparatus when a personal computer provides a state display monitor according to an embodiment of the present invention.
Figure 11:
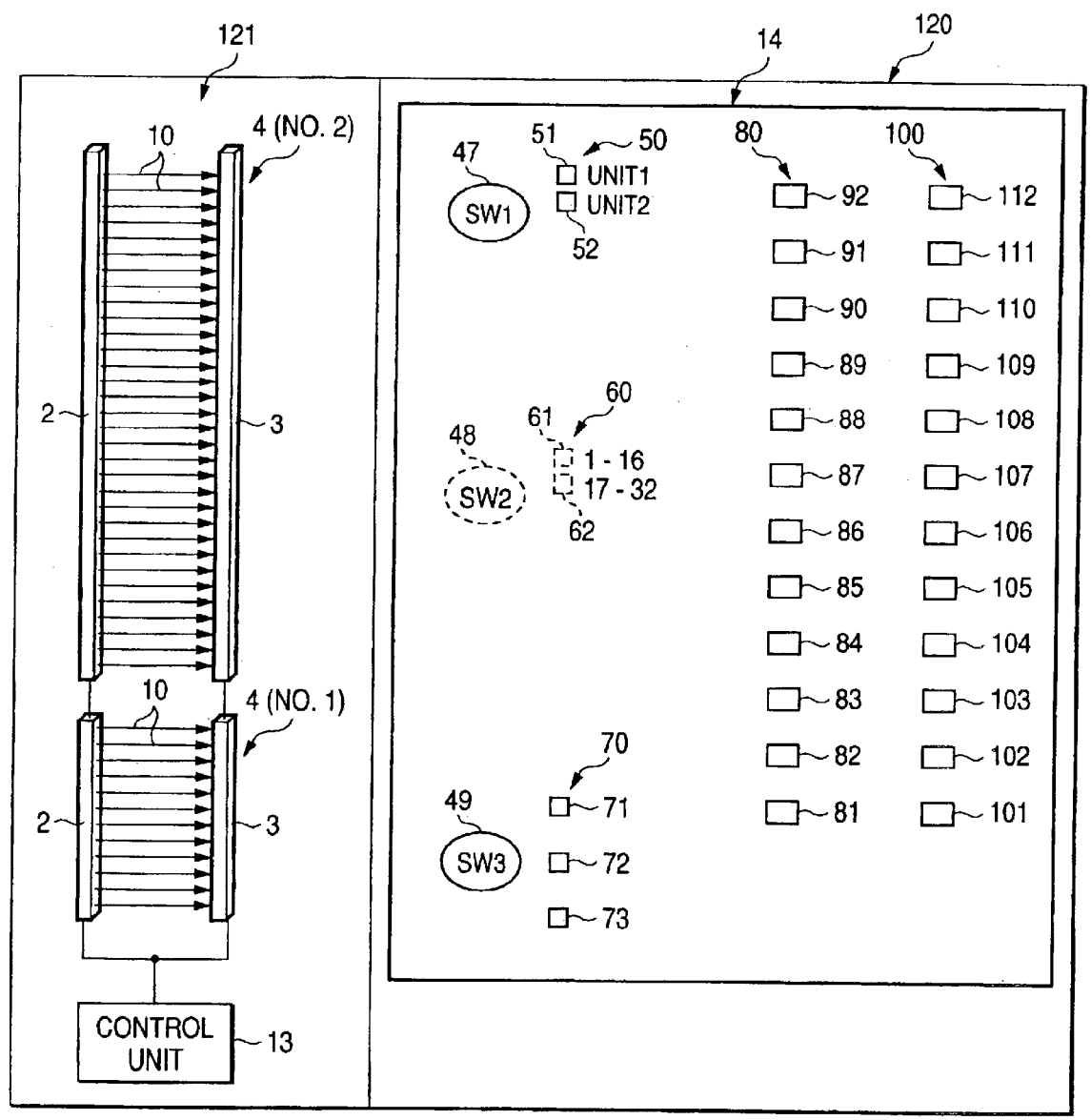
FIG. 11 is a drawing to illustrate a monitor screen displayed on a display screen of the personal computer according to the embodiment in FIG. 10.

FIGS. 10 and 11 show an example where a personal computer is used as the control unit 13 and the state display monitor 14 is produced by software on the personal computer, as will be described below.

The multi-optical-path photoelectric safety apparatus 1 shown in FIG. 10 includes two multi-optical-path photoelectric sensor units 4 by way of example. The first sensor unit 4 (No. 1) is a 12-optical-path photoelectric sensor unit 4 including 12 light emission elements and 12 light reception elements. The second sensor unit 4 (No. 2) is a 32-optical-path photoelectric sensor unit 4 including 32 light emission elements and 32 light reception elements.

The sensor units 4 shown in FIG. 10 do not include the optical path adjustment display section 11 or the output indicator lamp 12. Even though they are shown in FIG. 1, the presence or absence of the optical path adjustment display section 11 and the output indicator lamp 12 is not essential for understanding. Thus it can also be understood that the optical path adjustment display section 11 and the output indicator lamp 12 are simply not shown in the sensor units 4 illustrated in FIG. 10.

FIG. 11 shows a display screen 120 for the personal computer substantially implementing the control unit 13. As seen in FIG. 11, a picture 121 for visually showing the whole multi-optical-path photoelectric safety apparatus 1 is displayed on the left side of the display screen 120 and the state display monitor 14 is displayed on the right side.

The picture 121 of the display screen 120 includes the control unit 13 and the first and second optical-path photoelectric sensor units 4. As for the unit display, the optical paths 10 are preferably shown for the reasons described later.

In the state display monitor 14, the number of indicator lamps contained in the mode state indicator lamp group 80 and the light incidence/light block state indicator lamp group 100 are adjusted considering the number of optical paths of each multi-optical-path photoelectric sensor unit 4 included in the multi-optical-path photoelectric safety apparatus 1. In this example, both the mode state indicator lamp group 80 and the light incidence/light block state indicator lamp group 100 are made up of 12 indicator lamps that match the number of optical paths of the first sensor unit 4 (12 optical paths).

In the state display monitor 14, the first group 50 indicates that the number of units displayed is made up of two indicator lamps 51 and 52 and that matches the number of the multi-optical-path photoelectric sensor units 4 included in the multi-optical-path photoelectric safety apparatus 1. The second group 60 indicates that the optical path areas displayed and is made up of two indicator lamps 61 to 62 that relate to the maximum number of optical paths of the multi-optical-path photoelectric sensor unit 4 included in the multi-optical-path photoelectric safety apparatus 1.

Figure 12:
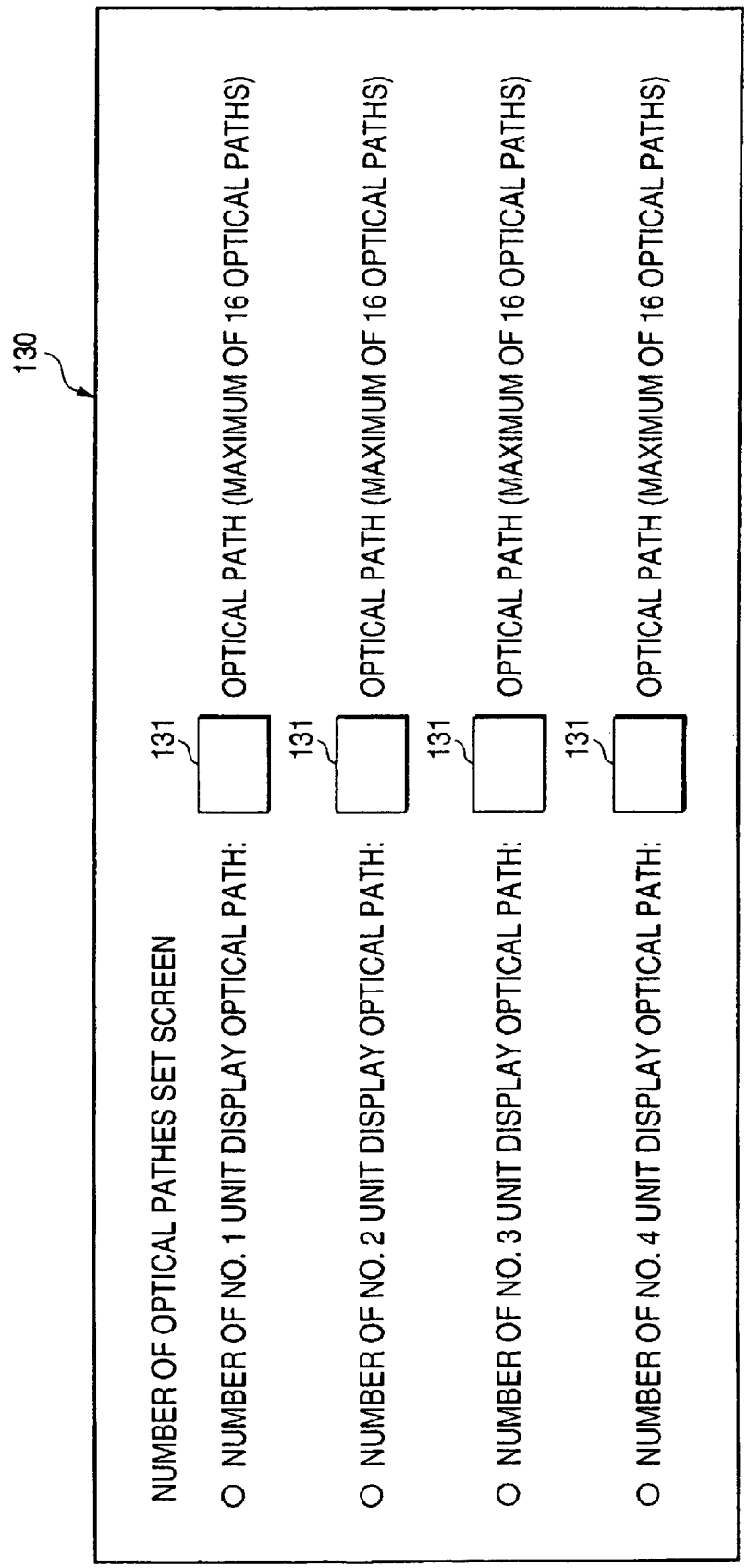
FIG. 12 shows an example of a set screen for the user to set the display form of the display monitor according to an embodiment of the present invention.

Preferably, the configuration of the state display monitor 14 is automatically generated in the personal computer as the number of the sensor units 4 included in the multi-optical-path photoelectric safety apparatus 1 and the number of optical paths of each sensor unit 4 are entered or the information representing the number of optical paths is transmitted from each sensor unit 4. As a further modification, a set screen 130 shown in FIG. 12 may be displayed and the user may enter predetermined information (such as the number of optical paths) in a number-of-optical-paths input field 131. This allows the user to set the desired configuration for the state display monitor 14.

It is particularly preferable that the display mode of the state display monitor 14 may be changed by switch 47 to specify the display mode fitted for the selected unit 4 relative to the unit number of the multi-optical-path photoelectric sensor unit 4 selected by the user.

For example, when the user selects the first multi-optical-path photoelectric sensor unit 4 (No. 1) comprising 12 optical paths by operating the switch 47, the mode state indicator lamp group 80 and the light incidence/light block state indicator lamp group 100 (each consisting of 12 indicator lamps) may be displayed on the state display monitor as shown in FIG. 11. On the other hand, when the user selects the second multi-optical-path photoelectric sensor unit 4 (No. 2) comprising 32 optical paths, the mode state indicator lamp group 80 and the light incidence/light block state indicator lamp group 100 (each consisting of 16 indicator lamps) enable the 32-optical-path photoelectric sensor unit 4 to be divided into two optical path areas that may be displayed on the state display monitor as shown in FIG. 6.

When the user selects the first sensor unit 4 (12 optical paths), the optical path area to be displayed need not be selected. Thus the display of the second switch 48 and the indicator lamps of the second group 60 may be grayed out as indicated by the dashed lines in FIG. 11 or they also may be hidden. On the other hand, when the user selects the second multi-optical-path photoelectric sensor unit 4 (No. 2) comprising 32 optical paths, the second switch 48 may be displayed and the indicator lamp 61 for indicating the first optical path area and the indicator lamp 62 for indicating the second optical path area may be displayed as the second group 60.

In this connection, if the state display monitor 14 previously described with reference to FIG. 6 is used with the multi-optical-path photoelectric safety apparatus 1 including a 12-optical-path photoelectric sensor unit 4, the first to 12th indicator lamps of the 16 indicator lamps making up the mode state indicator lamp group 80 and the light incidence/light block state indicator lamp group 100 indicate the optical paths corresponding to the 12-optical-path photoelectric sensor unit 4, and the other indicators (the 13th–16th indicator lamps) enter a non-display mode.

However, when the user sees the 13th–16th indicator lamps in the non-display mode, the user cannot instantaneously determine whether "the corresponding optical paths do not exist" or "some trouble exists." This problem can be easily solved by adopting the display mode for the state display monitor 14 previously described with reference to FIG. 11.

Preferably, the identification display shows the currently displayed optical path area in a different color and is produced in the picture 121 of the whole system configuration as shown on the left side of FIG. 11. For example, to indicate the currently displayed unit, the corresponding light emitter 2 and light receiver 3 may be shown in red and/or they may be blinked and the other units may be indicated in green. To indicate the currently displayed optical path area in the currently displayed unit, the optical paths 10 contained in the corresponding optical path area may be shown in red and/or they may be blinked and the other optical path areas may be indicated in green.

As another modification, one or more input fields 135 and 136 for prompting the user to enter are preferably provided in the proximity of the second switch 48 in FIG. 11. The user may enter the optical path number in the input fields 135, 136, thereby displaying the optical path area relating to the entered optical path number on the mode state indicator lamp group 80 and the light incidence/light block status indicator lamp group 100.

For example, the second multi-optical-path photoelectric sensor unit (No. 2) is a 32-optical-path sensor unit and is divided into the first optical path area having the first to 16th optical paths and the second optical path area having the 17th to 32nd optical paths in the basic display mode for displaying on the mode state indicator lamp group 80 and the light incidence/light block status indicator lamp group 100, as previously described. However, if a special function such as the floating blanking function is set across the 16th and 17th optical paths, it is not preferred that the optical path area where the floating blanking function is set have a divided display.

Preferably the display area displayed on the mode state indicator lamp group 80 and the light incidence/light block state indicator lamp group 100 is adjusted so that the optical path area specified by the user (by entering the start and end optical path numbers of the optical path area for which the special function in the entry fields 135 and 136) appears, for example, in the middle of the mode state indicator lamp group 80 and the light incidence/light block state indicator lamp group 100.

This allows the user to check the state of the optical path area where the special function is set on one screen. As a further modification, the optical path area specified by the user by entering the start and/or the end optical path number of the optical path area to be displayed in the entry fields 135 and/or 136 may be displayed on the mode state indicator lamp group 80 and the light incidence/light block status indicator lamp group 100.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2002-017571 filed Jan. 25, 2002 is hereby incorporated by reference.

What is claimed is:

1. A display monitor for a multi-optical-path photoelectric safety apparatus having a multi-optical-path photoelectric sensor unit that includes a light emitter comprising a plurality of light emission elements and a light receiver having a corresponding number of light reception elements as the plurality of light emission elements, the light emission elements and the light reception elements forming a plurality of optical paths, said display monitor comprising:

a first display section having a plurality of indicator lamps that indicate a light incidence/light block status condition for each of the plurality of optical paths; and a first switch section for selecting an optical path area from among optical path areas into which the plurality of optical paths are grouped with the number of the indicator lamps of the first display section, wherein the optical path area is selected by operating the first switch section and information concerning the light incidence/light block status condition of the optical paths in the selected optical path area is displayed on the first display section.

2. The display monitor as claimed in claim 1, wherein the multi-optical-path photoelectric safety apparatus includes a plurality of multi-optical-path photoelectric sensor units, and wherein said display monitor further comprises:

a second switch section for selecting the multi-optical-path photoelectric sensor unit to be displayed on the first display section.

3. The display monitor as claimed in claim 2, further comprising:

a second display section for displaying the multi-optical-path photoelectric sensor unit selected by using the second switch section.

4. The display monitor as claimed in claim 1, wherein the multi-optical-path photoelectric safety apparatus has a special function that can be set for each optical path, and wherein said display monitor further comprises:

a third display section having a corresponding number of indicator lamps as the number of the indicator lamps in the first display section that indicate whether the special function is set for each of the optical paths of the multi-optical-path photoelectric sensor unit, and the third display section indicates whether the special function is set for the optical paths contained in the selected optical path area.

5. The display monitor as claimed in claim 4, wherein the multi-optical-path photoelectric safety apparatus includes a plurality of multi-optical-path photoelectric sensor units, and wherein said display monitor further comprises:

a second switch section for selecting the multi-optical-path photoelectric sensor unit to be displayed from among the plurality of multi-optical-path photoelectric sensor units.

6. The display monitor as claimed in claim 5, further comprising:

a second display section for displaying the multi-optical-path photoelectric sensor unit selected by using the second switch section.

7. The display monitor as claimed in claim 4, wherein the multi-optical-path photoelectric safety apparatus has a plurality of special functions, and wherein said display monitor further comprises:
  a third switch section for selecting one of the plurality of special functions to be displayed on the third display section.

8. The display monitor as claimed in claim 7, further comprising:
  a fourth display section for displaying the special function selected by using the third switch section.

9. The display monitor as claimed in claim 1, wherein said display monitor includes a housing separate from the light receiver and the light emitter.

10. A display monitor for a multi-optical-path photoelectric safety apparatus having a plurality of multi-optical-path photoelectric sensor units, each of the multi-optical-path photoelectric sensor units includes a light emitter comprising a plurality of light emission elements and a light receiver having a corresponding number of light reception elements as the plurality of light emission elements, the multi-optical-path photoelectric safety apparatus having a special function that can be set for each optical path of each unit, said display monitor comprising:
  a light incidence/light block status indicator lamp group including a plurality of indicator lamps each indicating a light incidence/light block state for each of the optical paths in one of optical path areas into which the optical paths in the multi-optical-path photoelectric safety apparatus are grouped;
  a mode state indicator lamp group having a corresponding number of indicator lamps as the plurality of indicator lamps of the light incidence/light block status indicator lamp group for displaying a setup state of the special function for each of the optical paths in the optical path area;
  a first selection section for selecting the unit to be displayed on the light incidence/light block status indicator lamp group and the mode state indicator lamp group from among the plurality of multi-optical-path photoelectric sensor units;
  a first group of indicator lamps for displaying the unit selected by using the first selection section;
  a second selection section for selecting the optical path area;
  a second group of indicator lamps for displaying the optical path area selected by using the second selection section;
  a third selection section for selecting the special function to be displayed on said display monitor; and
  a third group of indicator lamps for displaying the special function selected by using the third selection section.

11. The display monitor as claimed in claim 10, wherein the first to third indicator lamp groups indicate at least one of the following, that the special function is set, that the light block state is in an unselected unit and an unselected optical path area.

12. The display monitor as claimed in claim 10, wherein said display monitor includes a housing separate from the light receiver and the light emitter.

13. A multi-optical-path photoelectric safety apparatus comprising:
  a multi-optical-path photoelectric sensor unit having a light emitter comprising a plurality of light emission elements and a light receiver comprising a corresponding number of light reception elements as the plurality of light emission elements in the light emitter, the light emission elements and the light reception elements forming a plurality of optical paths; and
  a control unit with a display monitor for receiving light incidence/light block information for each optical path from the multi-optical-path photoelectric sensor unit and displaying the light incidence/light block information for each optical path on the display monitor, said display monitor including:
  a first display section having a plurality of indicator lamps each that indicate a light incidence/light block status condition for each of the optical paths; and
  a first switch section for selecting an optical path area from among optical path areas into which the plurality of optical paths are grouped with the number of the indicator lamps of the first display section,
  wherein the optical path area is selected by operating the first switch section and information concerning light incidence/light block status condition of the optical paths in the selected optical path area is displayed on the first display section.

14. A display monitor for a multi-optical-path photoelectric safety apparatus having a multi-optical-path photoelectric sensor unit that includes a light emitter comprising a plurality of light emission elements and a light receiver having a corresponding number of light reception elements as the plurality of light emission elements, the light emission elements and the light reception elements forming a plurality of optical paths, said display monitor comprising:
  first display means having a plurality of indicator lamps that indicate a light incidence/light block status condition for each of the plurality of optical paths; and
  first switch means for selecting an optical path area from among optical path areas into which the plurality of optical paths are grouped with the number of the indicator lamps of the first display means,
  wherein the optical path area is selected by operating the first switch means and information concerning the light incidence/light block status condition of the optical paths in the selected optical path area is displayed on the first display means.

15. The display monitor as claimed in claim 14, wherein the multi-optical-path photoelectric safety apparatus includes a plurality of multi-optical-path photoelectric sensor units, and wherein said display monitor further comprises:
  second switch means for selecting the multi-optical-path photoelectric sensor unit to be displayed on the first display means.

16. The display monitor as claimed in claim 15, further comprising:
  second display means for displaying the multi-optical-path photoelectric sensor unit selected by using the second switch means.

17. The display monitor as claimed in claim 14, wherein the multi-optical-path photoelectric safety apparatus has a special function that can be set for each optical path, and wherein said display monitor further comprises:
  third display means having a corresponding number of indicator lamps as the number of the indicator lamps in the first display means that indicate whether the special function is set for each of the optical paths of the multi-optical-path photoelectric sensor unit, and the third display means indicates whether the special function is set for the optical paths contained in the selected optical path area.

18. The display monitor as claimed in claim 17, wherein the multi-optical-path photoelectric safety apparatus includes a plurality of multi-optical-path photoelectric sensor units, and wherein said display monitor further comprises:

second switch means for selecting the multi-optical-path photoelectric sensor unit to be displayed from among the plurality of multi-optical-path photoelectric sensor units.

19. The display monitor as claimed in claim 18, further comprising:

second display means for displaying the multi-optical-path photoelectric sensor unit selected by using the second switch means.

20. The display monitor as claimed in claim 17, wherein the multi-optical-path photoelectric safety apparatus has a plurality of special functions, and wherein said display monitor further comprises:

third switch means for selecting one of the plurality of special functions to be displayed on the third display means.

21. The display monitor as claimed in claim 20, further comprising:

fourth display means for displaying the special function selected by using the third switch means.

22. The display monitor as claimed in claim 14, wherein said display monitor includes a housing separate from the light receiver and the light emitter.

* * * * *